United States Patent [19]

Motohiro et al.

[11] Patent Number: 5,754,829

[45] Date of Patent: May 19, 1998

[54] PARALLEL COMPUTER SYSTEM OPERATING METHOD EMPLOYING A MANAGER NODE TO DISTRIBUTE ATTRIBUTES OF INDIVIDUAL SERVERS

[75] Inventors: Masahisa Motohiro, Yokohama; Toshio Shibuya, Fujisawa, both of Japan

[73] Assignees: Hitachi, Ltd., Tokyo; Hitachi Software Engineering Co., Ltd., Yokohama, both of Japan

[21] Appl. No.: 518,976

[22] Filed: Aug. 24, 1995

[30] Foreign Application Priority Data

Aug. 26, 1994 [JP] Japan .................................. 6-201635

[51] Int. Cl.[6] .................................................. H04L 12/28
[52] U.S. Cl. ................ 395/500; 364/242.95; 364/940.62
[58] Field of Search ........................... 395/500, 200.05, 395/200.01, 182.02, 200.1, 800; 364/550; 370/401; 371/32

[56] References Cited

U.S. PATENT DOCUMENTS

| | | | |
|---|---|---|---|
| 5,375,070 | 12/1994 | Hershey et al. | 364/550 |
| 5,448,724 | 9/1995 | Hayashi | 395/182.02 |
| 5,511,208 | 4/1996 | Boyles et al. | 395/800 |
| 5,526,358 | 6/1996 | Gregerson et al. | 370/401 |
| 5,546,540 | 8/1996 | White | 395/200.1 |
| 5,561,769 | 10/1996 | Kumar et al. | 395/200.05 |
| 5,568,605 | 10/1996 | Clouston et al. | 395/182.02 |

*Primary Examiner*—Kevin J. Teska
*Assistant Examiner*—Dan Fiul
*Attorney, Agent, or Firm*—Antonelli, Terry, Stout & Kraus, LLP

[57] ABSTRACT

A parallel computer system in which a plurality of host computers are connected in a network and a plurality of servers having different attributes are allocated to the plurality of host computers. One of the plurality of host computers is previously designated as a manager node. Each of the host computers judges whether or not the own host computer is the manager node when started. The host computer decided as the manager node issues through the network to the other host computers a request demanding report of information on respective resources possessed by the other host computers on a broadcast transmission basis. In response to the broadcast transmission, the other host computers transmit information on their own resources through said network to said manager node. The manager node, on the basis of the resource information transmitted from the other host computers, determines attributes of servers to be carried out by the other host computers and transmits the determined server attributes through the network to the other host computers. Each of the other host computers receives the server attributes determined by the manager node and initializes its own host computer with the received associated server attributes.

16 Claims, 6 Drawing Sheets

SERVER CONFIGURATION DEFINITION TABLE

| SERVER TYPE | SERVER CONFIGURATION RATE (%) |
|---|---|
| FES | 10 |
| BES | 30 |
| SAS | 30 |
| IOS | 30 |

200

FES : FRONT END SERVER

BES : BACK END SERVER

SAS : SORT ASSIST SERVER

IOS : I/O SERVER

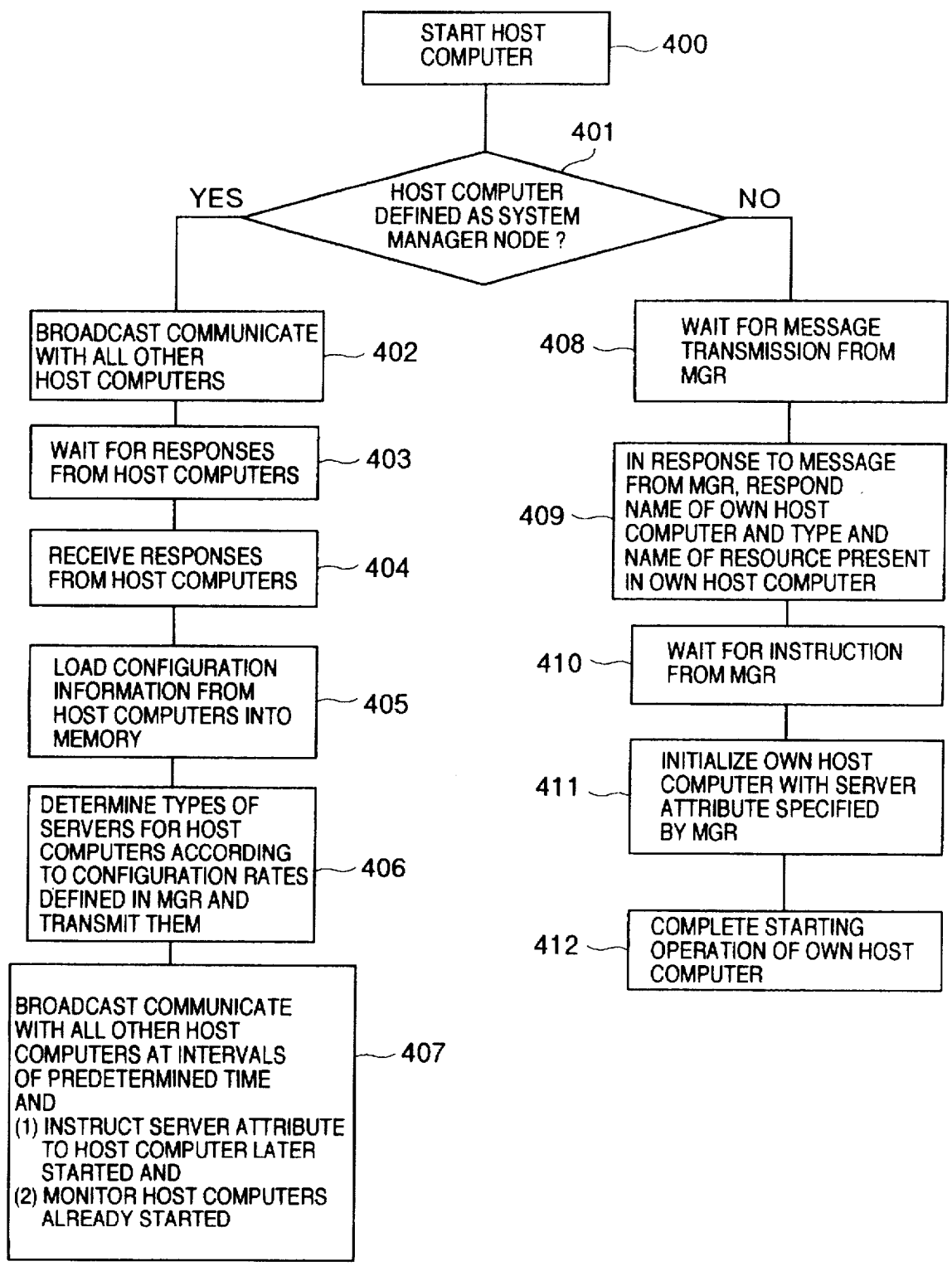

FIG.4

PARALLEL SYSTEM CONFIGURATION TABLE 500

| HOST COMPUTER IDENTIFIER | SERVER ATTRIBUTE | RESOURCE TYPE | RESOURCE NAME | HOST ADDRESS |
|---|---|---|---|---|
| host 001 | FES | DISK | dev001 | xyz001 |
|  |  | LAN | port01 |  |
| host 002 | BES | DISK | dev002 | xyz002 |
|  | IOS | DB | db002 |  |
| host 003 | BES | DISK | dev003 | xyz003 |
|  | IOS | DB | db003 |  |
| host 004 | SAS | LAN | port04 | xyz004 |
| host 005 | SAS | DISK | dev005 | xyz005 |
| host 006 | SAS | DISK | dev005 | xyz006 |
|  |  | DISK | dev006 |  |
| host 007 | SAS | DISK | dev007 | xyz007 |
| host 008 | SAS |  |  | xyz008 |
| host 009 | SAS |  |  | xyz009 |

501 — HOST COMPUTER IDENTIFIER
502 — SERVER ATTRIBUTE
503 — RESOURCE TYPE
504 — RESOURCE NAME
505 — HOST ADDRESS

(FES DETERMINATION)
(1) DETERMINE THE NUMBER OF HOST COMPUTERS AS FESs BASED ON THE CONFIGURATION RATE AND THE NUMBER OF HOST COMPUTERS EACH HAVING A LAN BOARD
(2) FESs ARE ALLOCATED TO ONES OF THE HOST COMPUTERS HAVING LAN BOARD AS FES CANDIDATES CORRESPONDING TO THE NUMBER DETERMINED BY (1)

IN THIS CASE, THE ALLOCATION IS DONE TO THE HOST COMPUTERS HAVING HOST ADDRESS CLOSE TO THOSE OF THE HOST COMPUTERS (EACH HAVING A DISK) TO BE BESs

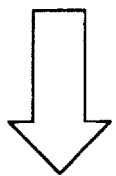

520

(BES DETERMINATION) (NOTE *)
(1) DETERMINE THE NUMBER OF HOST COMPUTERS AS BESs BASED ON THE CONFIGURATION RATE AND THE NUMBER OF HOST COMPUTERS EACH HAVING A DISK
   IN THIS CONNECTION, SINCE RESOURCE DB INFORMATION ARE RETURNED FROM HOST COMPUTERS ALREADY HAVING DBs, BESs MUST BE NECESSARILY ALLOCATED TO THOSE HOST COMPUTERS
(2) ALLOCATION SHOULD BE DONE JUDGING FROM THE HOSTS ADDRESSES TO PROVIDE OPTIMUM COMMUNICATION WITH FESs (*) ALLOCATE IOSs TO BES HOST COMPUTERS

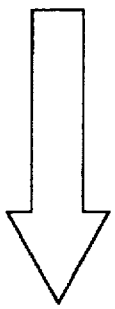

530

(SAS DETERMINATION)
(1) ALLOCATE SASs TO THE REMAINING HOST COMPUTERS BASICALLY

PARALLEL COMPUTER SYSTEM OPERATING METHOD EMPLOYING A MANAGER NODE TO DISTRIBUTE ATTRIBUTES OF INDIVIDUAL SERVERS

BACKGROUND OF THE INVENTION

The present invention relates to a parallel computer system which is made up of a network and more particularly, to a method for operating a computer system wherein a plurality of servers having different roles are located as distributed on a plurality of independent host computers mutually connected in a network and these servers are cooperatively operated as a single parallel computer system as a whole.

There is conventionally provided a computer system in which a plurality of host computers are cooperatively operated to form a single parallel computer system. In such a parallel computer system, configuration definition information about how which servers are located and operated for which host computers has been separately prepared by the respective operators of the host computers. In other words, it has been necessary for the respective operators of the host computers to separately define how to start which servers by which host computers.

Suggested in JP-A-5-108525, on the other hand, is a method wherein one of host computers has a definition file in which the entire configuration of a system is defined and identifiers are attached to the respective host computers and stored as definition information. When it is desired to define one of the host computers other than the above host computer, the host computer having the definition file converts the associated identifier attached to the definition to the address of the host computer in question and sends the definition to the address. The host computer having received the definition attaches its own identifier to the received definition and stores the definition therein. In this way, according to this method, the definition information of the respective host computers is uniformly managed to be distributed to the respective host computers on the basis of the identifier information of the respective host computers.

Also proposed in JP-A-4-260149 is a method by which configuration elements of networks are centralizedly defined on a graphic terminal to distribute configuration parameters to the node terminals of the networks.

These suggestions find a similarity in that the operator describes, on the configuration definition file, which servers are allocated and executed for which host computers for uniform management and the definition is distributed to the respective host computers.

In the above prior arts, however, when the operator cannot recognize the whole number of host computers in the parallel system as well as the identifiers of the host computers, he/she cannot prepare the entire configuration definition. Accordingly, in the case where the number of host computers reaches the order of 100–1000, even when the operators tries to prepare the individual definitions on the respective host computers, it is practically impossible to realize it because the host computer number is too large, i.e., exceeds its readily-definable range. Further, even when a single host computer uniformly manages the configuration definition file as mentioned above, it is necessary for the operator to define the uniformly-managed configuration definition file while recognizing the identifiers of the respective host computers. It is practically impossible that users allocate the identifiers of the host computers as large in number as the order of 100–1000 in the one-dimensional definition file because of the large host computer number exceeding its readily-manageable range, which leads disadvantageously to the fact that the system configuration definition and definition modification become troublesome.

SUMMARY OF THE INVENTION

It is therefore an object of the present invention to provide a method for operating a parallel computer system which is made up of a large number of host computers to allow allocation of servers to the respective host computers to be dynamically defined.

For the purpose of attaining the above object, in accordance with the present invention, it is preferable that one of host computers of on the order of 100–1000 in number be previously defined as a manager node. And set in the host computer as the manager node is a relationship between the types of servers allocated in a parallel computer system and the numbers of the server types. The manager node determines according to the above set contents which types of servers are located as distributed to which host computers and thereafter transmits the determined contents to the other host computers through the network to allocate the servers of the types specified by the transmitted contents to the other host computers.

That is, in the present invention, the system configuration is automatically determined dynamically when the parallel computer system is started, as compared with the configuration in which an operator first defines a system configuration statically and then starts the system. In the present invention, the numbers of servers to be set with respect to the different server types may be set not only in the form of specific numeric values but also in the form of ratios (e.g., percentage) of the number of the different types of servers with respect to the total number of all the servers in the system.

In accordance with the present invention, when the server types and server numbers (a server configuration definition table showing a relationship therebetween) allocated in the parallel computer system are set within the host computer of the manager node, the host computer of the manager node issues to the other host computers a message demanding report on the types of resources possessed by the other host computers. The host computer of the manager node, on the basis of the types of the resources returned from the other host computers, determines which types of servers are allocated as distributed to which ones of the other host computers according to the set contents, and transmits the determined contents to the respective host computers through the network.

The respective host computers, when receiving the determined contents from the manager node, sets themselves with the server attributes specified by the received contents and start their operation. Thus, it becomes unnecessary that, in a start mode, the host computer of the manager node recognize the host identifiers of all the host computers. In other words, the need for the manager node to describe the identifiers of the host computers in a definition file in the start mode can be eliminated. And it is only required that the associated host computer identifiers be included in the associated resource type information returned from the other host computers.

As a result, with the parallel computer system made up of host computers of the order of 100–1000 in number, the system can be operated without involving such troublesome definition that operators determine which server functions are allocated to which host computers while taking the identifiers of the individual host computers into consideration.

In the invention, since the determined contents of the server distribution locations is transmitted to the other host computers repetitively at intervals of a predetermined time, even when one of the host computers is started later than the manager node or a host computer newly added later is started, the manager node can reliably instruct these host computers to be operated as which types of servers.

BRIEF DESCRIPTION OF THE DRAWINGS

FIG. 3 is a flowchart for explaining the operation of host computers;

FIG. 4 is a parallel computer system configuration table stored in the manager node shown in FIG. 1;

FIG. 5 is a flowchart for briefly explaining how a host computer as the manager node determines the types of servers of the other host computers.

DESCRIPTION OF THE PREFERRED EMBODIMENTS

The present invention will be detailed in connection with an illustrated embodiment.

Figure 1:
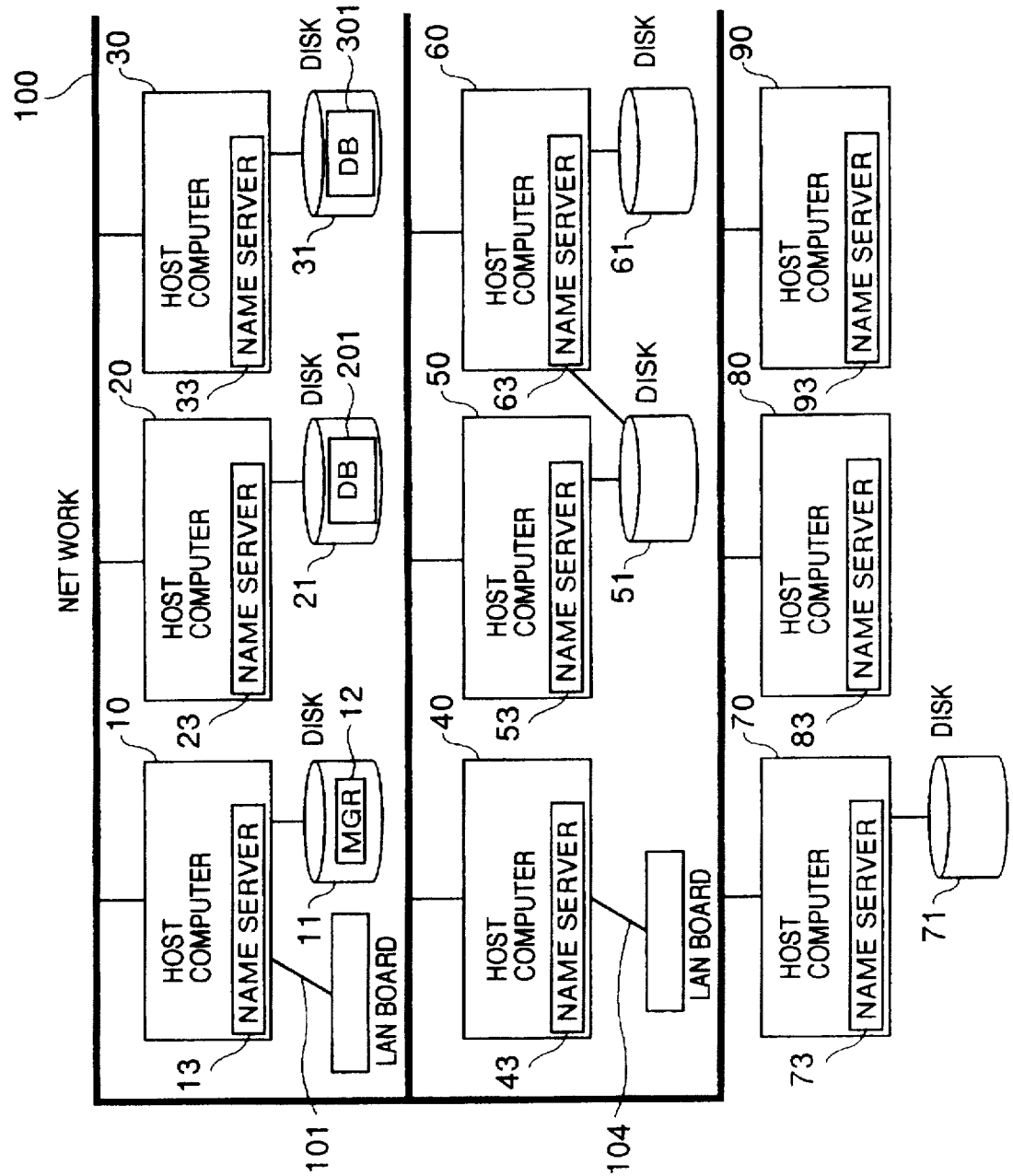
FIG. 1 shows a configuration of an embodiment of a parallel computer system to which the present invention is applied.

Referring first to FIG. 1, there is shown a configuration of an embodiment of a parallel computer system to which the present invention is applied, which includes a host computer 10 defined as a manager node and other host computers 20 to 90, the host computers 10, 20, 30, 50, 60 and 70 being connected to disks 11, 21, 31, 51, 61 and 71, respectively. Connected to the host computer 10 is also a LAN board 101, in addition to the disk 11. The disk 51 is also connected to the host computer 60 so that the host computers 50 and 60 share the data of the disk 51.

The host computer 40 is connected only with the LAN board 101 while the host computers 80 and 90 are not connected with any external devices. Set in the host computers 10 to 90 are respective name servers, which operation will be explained later. These host computers 10 to 90 are mutually connected in a system network 100 having a broadcasting function as a hardware mechanism.

Figure 2:
FIG. 2 is a server configuration definition table stored in a manager node shown in FIG. 1.

Such a server configuration definition table 200 as shown in FIG. 2 is provided within the host computer 10 defined as the manager node. Set in the table are relationships between server types and server configuration rates. In the illustrated example, front end server (FES), back end server (BES), sort assist server (SAS) and IOS=30% are set as the server types, whereas FES=10%, BES=30%, SAS=30% and IOS=30% as the configuration ratios with respect to all the servers.

Whether or not each host computer is defined as the manager node is determined by the presence of a definition information file 12 in the disk connected to the host computer as the manager node. In the present embodiment, the definition information file 12 indicative of the host computer 10 to be the manager node is stored only in the disk 11 connected to the host computer 10.

FIG. 3 is a flowchart for explaining the operation of the respective host computers in the present embodiment. Explanation will next be made as to the operation of the host computers in accordance with this flowchart.

First, the host computers are started (step 400), the respective host computers judge whether to be defined as the manager node. This is judged, as mentioned above, by the presence or absence of the definition information file 12 stored in the disk connected to each host computer (step 401).

When the own host computer corresponds to the host computer 10 defined as the manager node, the manager node host computer transmits, on a broadcast basis, a message requiring return of the identifiers of the respective host computers, the types of the existing resources and resource names to all the other host computers 20 to 90 connected in the network 100 (step 402), and put in such a state as to wait for message responses from the host computers 20 to 90 (step 403).

When receiving responses from the host computers 20 to 90 (step 404), the host computer 10 loads into a memory the above information as parallel system configuration information received from the host computers 20 to 90, that is, an identifier 501 of each of the host computers 20 to 90, and existing resource type 503 and a resource name 504 together with a host address 505, in the form of such a parallel system configuration table 500 as shown in FIG. 4 (step 405). In this case, the identifier 501, existing resource type 503 and resource name 504 of its own (host computer 10) are also loaded.

With the arrangement of FIG. 1, for example, "DISK" and "LAN" indicative of the presence of the disk 11 and the LAN board 101 as the resource type 503 of the host computer 10 are loaded as the record of the identifier "host001" of the host computer 10. Further "DISK" and "DB" indicative of the presence of the disk 21 and the database 201 as the resource type 503 of the host computer 20 are loaded as the record of the identifier "host002" of the host computer 20. Similarly, "DISK" and "DB" indicative of the presence of the disk 31 and the database 301 as the resource type 503 of the host computer 30 are loaded as the record of the identifier "host003" of the host computer 20. The same holds true for the other host computers 40 to 90.

The host computer 10 then decides the types of the servers to be carried out over the other host computers 20 to 90, in accordance with information about resource type and so on collected from the other host computers 20 to 80 and loaded in the parallel system configuration table 500 as well as the server configuration definition information defined in the server configuration definition table 200 of FIG. 2. The host computer 10 loads server attributes 502 indicative of the decided server types into the table 500 of FIG. 4, and thereafter transmits the table together with the identifiers 501 to the respective host computers 20 to 90 individually through the network 100 (step 406).

For example, when it is desired to form a database management system on a parallel computer system, the system is intended to comprise a front end server (FES) for analyzing an SQL command to instruct each DB processing server of the optimum processing procedure, a back end server (BES) for controlling the database accessing operation, a sort assist server (SAS) for performing, in particular, data sorting and merging operation during the database processing, and an I/O server (IOS) for controlling the disk input and output.

In such a case, upon distribution of the servers to be performed by the host computers 20 to 90, the host computer 10, on the basis of the types of the resources possessed by the host computers 20 to 90 and the positions of the resources in the network, determines such server array as to cause the optimum function and performance of the system. For example, the host computer to be the IOS is required to have a disk and the host computer to be the FES is required to have a LAN board for connection with an external LAN or the like, so such server array will be determined of itself. Meanwhile, in the case where the number of host computers capable of serving as a certain type of servers is larger than the number corresponding to the associated specified server ratios with respect to a total number of host computers in the parallel system, the server distribution is determined so that, for example, data transfer between the servers is minimized with the server array taking the load of the network into consideration.

Shown in FIG. 5 is a flowchart for briefly explaining how to determine which servers are allocated to which host computers. At a step 510, first, the system manager host computer 10 determines the number n of host computers as FESs based on the server configuration ratios with respect to the server types defined in the server configuration definition table 200 of FIG. 2 as well as the number of host computers each having a LAN board.

And the server attribute "FES" is allocated to ones of the n host computers corresponding in number to the FES server configuration rate defined in the server configuration definition table 200. In this case, the allocation is carried out to the host computers having host addresses close to those of host computers as BESs.

The host computer 10 then determines at a next step 520 the number m of host computers as BESs based on the server configuration ratios with respect to the server types defined in the server configuration definition table 200 of FIG. 2 as well as the number of host computers each having a disk.

And the server attribute "BES" is allocated to ones of the m host computers corresponding in number to the BES server configuration rate defined in the server configuration definition table 200. The host computer 10, however, already receives the "DB" as resource type 503 from the host computers having the database DB formed therein, so that the server attribute "BES" must necessarily be allocated to such host computers. Even in this case, the allocation is carried out to the host computers having host addressed close to those of host computers as FESs. In this connection, the server attribute "IOS" is also allocated to the host computers as BESs.

Then at a step 530, the server attribute "SAS" is allocated to the remaining host computers. Though not illustrated in FIG. 5, if the number of host computers satisfying the conditions of a certain type of server is smaller than the number corresponding to the associated specified server configuration ratio, then the specific server type is allocated to all the host computers satisfying the conditions.

After having determined the node types of the host computers in this way, the host computer 10 continues to repetitively transmit a server attribute message to all the other host computers at intervals of a constant time in a broadcast communication manner and also monitors the already started host computers (step 407).

For this reason, even when a host computer is started later than the host computer 10 (later than the step 407), the host computer in question can respond to the host computer 10 during the next broadcast communication of the host computer 10. As a result, the host computer 10 can recognize the presence of any host computers started later and can give the respective instructions of the server types to the host computers at the recognition time.

In this way, at the time when the host computer 10 completes the issuance of the server type instructions to the host computers 20 to 90, the host computer 10 defined as the manager node finishes its starting operation.

Explanation will next be made as to the host computers 20 to 90 defined as the non-manager node, by referring to FIG. 3. When any one of the host computers 20 to 90 is started, the started host computer recognizes itself that the own host computer is not defined as the manager node (step 401) and put in such a state as to wait for a message from the host computer 10 defined as the manager node (step 408).

When receiving the message from the host computer 10, the started host computer transmits to the host computer 10 its own host computer identifier 501, existing resource type 503 and resource name 504 as a response (step 409). Thereafter, the started host computer is put in a wait state to wait for an instruction from the host computer 10 (step 410).

When receiving a server attribute instruction from the host computer 10, the started host computer starts the initializing operation of its own host computer with the instructed server attribute (step 411). After completing the initializing operation, the host computer in question completes its starting operation (step 412), that is, acts as the server of the type designated by the host computer 10.

In the foregoing embodiment, only the host computer 10 as the manager node has the parallel system configuration table 500 and the other host computers know their own server attributes alone. However, each of the other host computers can know the server attributes of the other host computers through the operation of the name servers possessed by the respective host computers, which will be explained in the following.

As already mentioned above, the host computers 10 to 90 have, in addition to the servers shown in FIG. 2, their own name servers 13, 23, 33, 43, 53, 63, 73, 83 and 93 each as a system server for control of the communication with each server on their own computers. The name servers of the host computers 10 to 90 registers therein the addresses of all the servers possessed by the respective host computers.

When the host computer 20 receives a communication request to a server S for example, the host computer 20 judges the presence or absence of the server S within the host computer 20 on the basis of the name server register. The presence of the server S within the host computer 20 causes the host computer 20 to perform its communication within the host computer 20; whereas the absence of the server S causes the host computer 20 to transmit a message to the name servers of the host computers other than the host computer 20 on a broadcast communication basis. The name server of the host computer having the server S to the message, e.g., the name server of the host computer 90 issues to the sender 20 a response indicative of the presence of the server S within the host computer 90. The host computer 20, when caching and holding the response therein, can know which servers allocated to which host computers without such definition information indicative of the whole allocation of all the servers to the host computers. Even when the communication party server caching the information becomes impossible to communicate due to abnormal termination or the like, this can be coped with by employing such a device that the host computer can again perform its broadcast communicating operation to search the location of the corresponding server.

In accordance with the present embodiment, in this way, such a parallel system that includes host computers of the order of 100–1000 in number can be operated without any need for troublesome definition of the servers allocated to the respective host computers while taking the identifiers of the respective host computers into consideration.

In this case, even in the case where a host computer is started later than the start of the host computer 10 as the manager node or where a host computer newly added later in the system is started, the host computer 10 can positively instruct such host computers to be started as which type of servers, when the host computer 10 repetitively transmits the contents of decision of the distributed array of the servers at intervals of a predetermined time.

Although the communication between the respective host computers has been carried out on the broadcast basis in the present embodiment, the present invention is not limited to the specific example but any communication format can be employed, so long as the format allows mutual transfer of resource and server attribute information between the host computers in the network.

Further, the recognition of a host computer to be operated as a manager node when started may be identified by the skeleton of the parallel system configuration table 500 of FIG. 4 or by the possession of the initialized table.

As mentioned above, the host computer 10, which is performing monitoring communication with all the other host computers at intervals of a constant time, can detect an abnormality occurred in one of the other host computers (for example, that the host computer failed). In such a case, if there is present such a host computer that can be replaced as an alternate by the abnormal host computer, then when the host computer 10 instructs the alternate host computer of the attribute of a server to be newly added and started, the server function so far carried out by the abnormal host computer can be prevented from being stopped for a long period of time.

More in detail, when the host computer 50 failed for example, the host computer 10 as the manager node can issue an instruction to the host computer 60 having the same disk as the host computer 50 connected thereto so that the host computer 60 substitutes the server function of the host computer 50.

Figure 6:
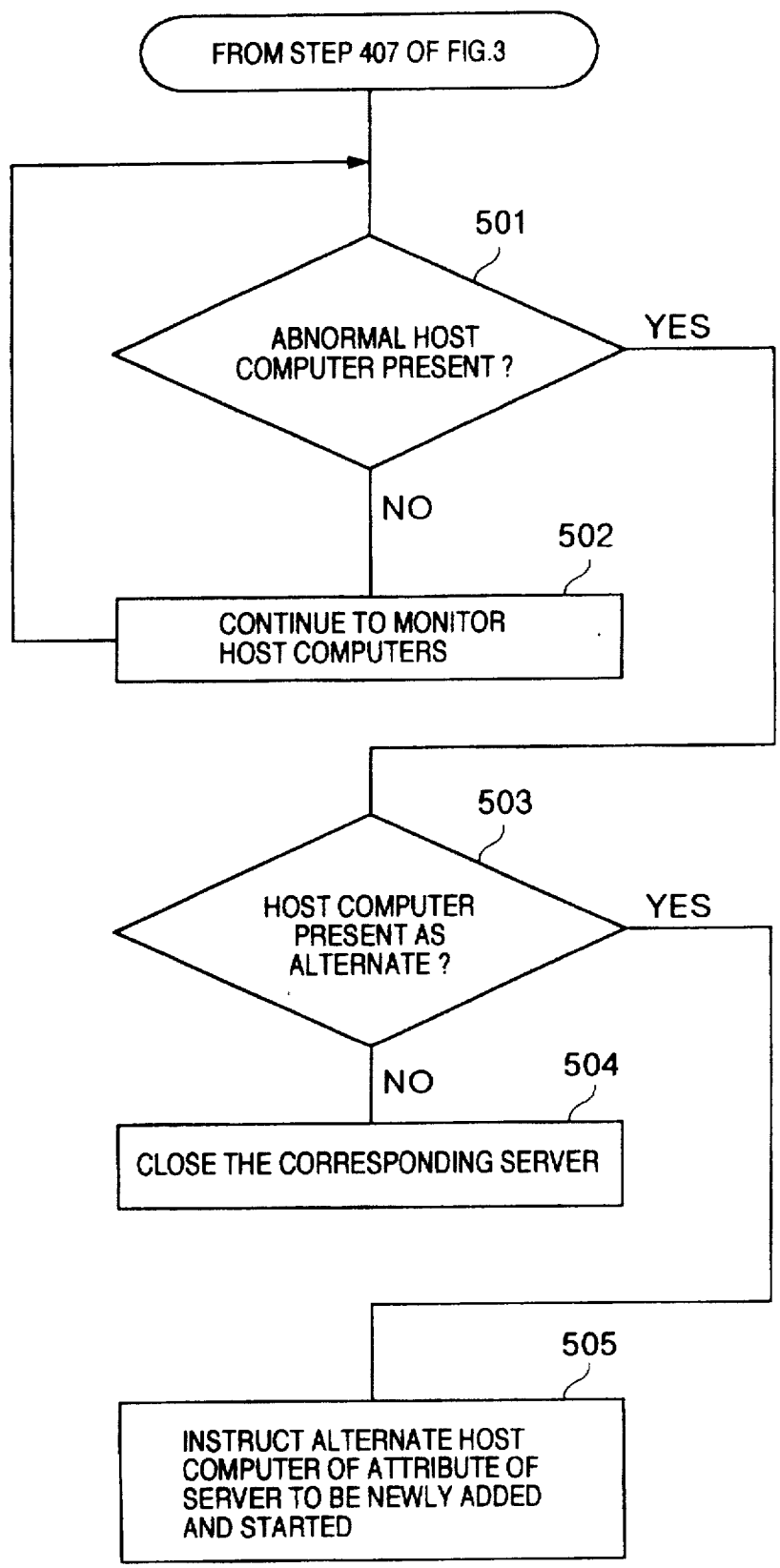
FIG. 6 is a flowchart for briefly explaining the operation of the manager node to be added to the operation of FIG. 5.

The above processing is shown in FIG. 6. More specifically, it is examined, on the basis of a response from the other host computers over the operation of the host computer 10 at the step 407 in FIG. 3, whether or not there is an abnormal (down) host computer (step 501). The determination of the host computer 10 of no abnormal host computer causes the host computer 10 to continue its monitoring operation (step 502).

When determining at the step 501 that there is an abnormal host computer, the host computer 10 advances to a step 503 to check the presence or absence of a host computer replaceable with the abnormal host computer. The absence of the alternate host computer causes the host computer 10 to close the abnormal host computer (step 504). The presence of the alternate host computer causes the host computer 10 to go to a step 505 where the server attribute so far allocated to the abnormal host computer is newly added and allocated to the alternate host computer.

What is claimed is:

1. A method for allocating a plurality of servers having different attributes to a plurality of host computers connected through a network in a parallel computer system, one of said plurality of host computers being previously designated as a manager node, the host computer previously designated as said manager node having information as to correspondence relationship between each of server types and a desired ratio or number of servers to be allocated for a server type in question with respect to all the servers, comprising the steps of:

judging in each of said host computers whether or not an associated host computer itself is used as said manager node when started;

in a host computer determined as the manager node, determining attributes indicating types of servers to be carried out by other host computers on the basis of the information as to correspondence relationship, and transmitting the determined server attributes from said manager node to the other host computers via said network; and in each of the other host computers, receiving the server attributes determined by said manager node and initializing an associated host computer with the received server attributes.

2. A method for allocating a plurality of servers having different attributes to a plurality of host computers connected through a network in a parallel computer system, one of said plurality of host computers being previously designated as a manager node, the host computer previously designated as said manager node having information as to correspondence relationship between each of server types and a desired ratio or number of servers to be allocated for a server type in question with respect to all the servers, comprising the steps of:

judging in each of said host computers whether or not an associated host computer itself is used as said manager node when started;

issuing from the host computer judged as the manager node to other host computers through said network a request demanding reports of information on respective resources possessed by the other host computers on a broadcast transmission basis;

in response to said broadcast transmission, transmitting information on their own resources from the other host computers through said network to said manager node, in said manager node, on the basis of the resource information transmitted from the other host computers, and the information as to correspondence relationship, determining attributes indicating types of servers to be carried out by the other host computers and transmitting the determined server attributes from said manager node through said network to the other host computers; and in each of the other host computers, receiving the server attributes determined by said manager node and initializing an associated own host computer with the received associated server attributes.

3. A method for allocating a plurality of servers having different attributes to a plurality of host computers connected through a network in a parallel computer system, one of said plurality of host computers being previously designated as a manager node, the host computer previously designated as said manager node having a server configuration definition table showing corresponding relationships between types of servers and a desired ratio of the host computers allocated by the servers with respect to all the host computers or a number of the allocated host computers, comprising the steps of:

judging in each of said host computers whether or not an associated host computer itself is used as said manager node when started;

in a host computer determined as said manager nodes determining, on the basis of the contents of said table, attributes indicating types of the respective servers to be carried out by the other host computers, and transmitting the determined server attributes from said manager node to the other host computers via said network; and in each of the other host computers, receiving the server attributes determined by said manager node and initializing an associated host computer with the received server attributes.

4. A method as set forth in claim 3, further comprising the steps of:

transmitting said determined server attributes from said manager node through said network to the other host computers on a broadcast basis at intervals of a predetermined time; and in response to the server attributes transmitted at said predetermined time intervals, initializing a newly started host computer with the server attributes associated therewith.

5. A method as set forth in claim 3, further comprising the steps of:

transmitting said determined server attributes from said manager node through said network to the other host computers on a broadcast basis at intervals of a predetermined time; and in said manager node, monitoring presence or absence of a host computer not responding to the server attributes transmitted at said predetermined time intervals to detect an abnormality in the host computer.

6. A method as set forth in claim 5, further comprising the steps of:

in said manager node, when an abnormality in the host computer is detected, detecting presence or absence of an alternate one of the host computers to the abnormal host computer;

when said alternate host computer is present, transmitting server attributes of the abnormal host computer from said manager node through said network to said alternate host computer; and in said alternate host computer, receiving said server attributes determined by said manager node and initializing its own host computer with the received server attributes.

7. A method as set forth in claim 3, wherein one of the host computers has a resource in which a file indicative of its own host computer as the manager node is stored, and the host computer recognizes itself, when started, to be the manager node based on said file.

8. A method as set forth in claim 3, wherein one of the host computers recognizes itself to be the manager node when said table is initialized.

9. A method for allocating a plurality of servers having different attributes to a plurality of host computers connected through a network in a parallel computer system, one of said plurality of host computers being previously designated as a manager node, the host computer previously designated as said manager node having a server configuration definition table showing corresponding relationships between types of servers and a desired ratio of the host computers allocated by the servers with respect to all the host computers or a number of the allocated host computers, comprising the steps of:

judging in each of said host computers whether or not an associated host computer itself is used as said manager node when started;

issuing from the host computer judged as the manager node to other host computers through said network a request demanding reports of information on respective resources possessed by the other host computers on a broadcast transmission basis;

in response to said broadcast transmission, transmitting information on their own resources from the other host computers through said network to said manager node.

10. A method as set forth in claim 9, further comprising the steps of:

transmitting said determined server attributes from said manager node through said network to the other host computers on a broadcast basis at intervals of a predetermined time; and in response to the server attributes transmitted at said predetermined time intervals, initializing a newly started host computer with the server attributes associated therewith.

11. A method as set forth in claim 9, further comprising the steps of:

transmitting said determined server attributes from said manager node through said network to the other host computers on a broadcast basis at intervals of a predetermined time; and in said manager node, monitoring presence or absence of a host computer not responding to the server attributes transmitted at said predetermined time intervals to detect an abnormality in the host computer.

12. A method as set forth in claim 11, further comprising the steps of:

in said manager node, when an abnormality in the host computer is detected, detecting presence or absence of an alternate one of the host computers to the abnormal host computer;

when said alternate host computer is present, transmitting server attributes of the abnormal host computer from said manager node through said network to said alternate host computer; and in said alternate host computer, receiving said server attributes determined by said manager node and initializing its own host computer with the received server attributes.

13. A method as set forth in claim 9, wherein the information on the resources transmitted from the other host computers include host computer identifiers for identifying the other host computers, and said manager node transmits said determined server attributes to the other host computers with use of the host computer identifiers contained in said resource information.

14. A method as set forth in claim 9, wherein one of the host computers has a resource in which a file indicative of its own host computer as the manager node is stored, and the host computer recognizes itself, when started, to be the manager node based on said file.

15. A method as set forth in claim 9, wherein one of the host computers recognizes itself to be the manager node when said table is initialized.

16. A parallel computer system comprising:

at least one network;

a plurality of host computers connected to said at least one network; and resources possessed by said plurality of host computers, wherein one of said plurality of host computers is previously designated as a manager node; a host computer recognizing to be said manager node when started issues to other host computers through said network a request demanding report of information on respective resources possessed by the other host computers on a broadcast transmission basis; the other host computers, in response to said broadcast transmission, transmit information on their own resources through said network to said manager node; said manager node, on the basis of the resource information transmitted from the other host computers; determines attributes of servers to be carried out by the other host computers and transmits the determined server attributes through said network to the other host computers, and the other host computers receive the server attributes determined by said manager node and initialize the associated host computers with the received server attributes.

* * * * *